July 25, 1939.  W. BLACKMORE  2,167,231
CAR TRUCK
Filed Jan. 22, 1935  4 Sheets-Sheet 1
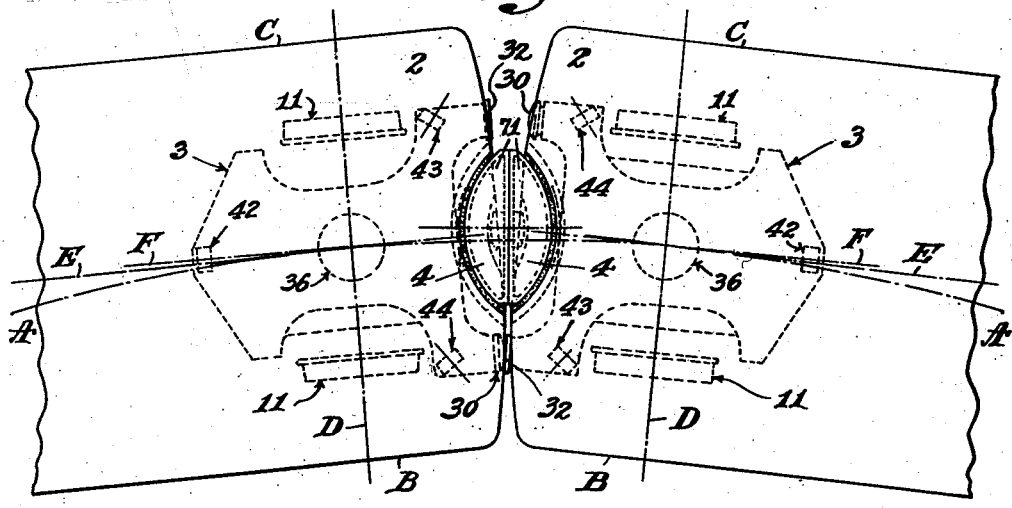
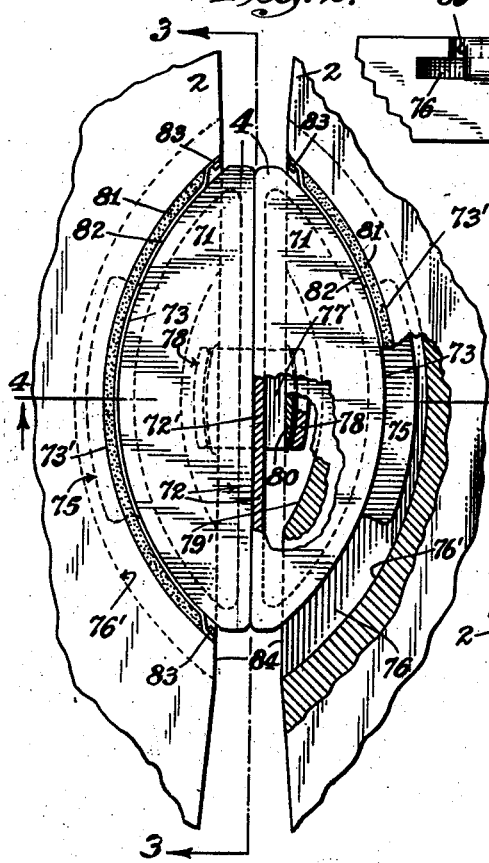
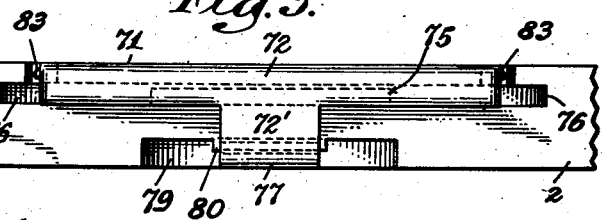
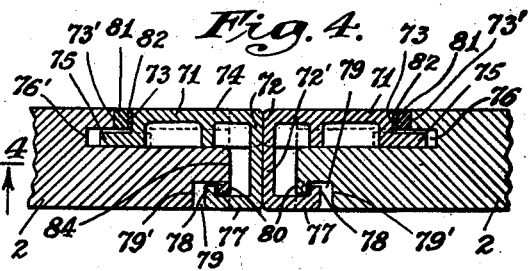
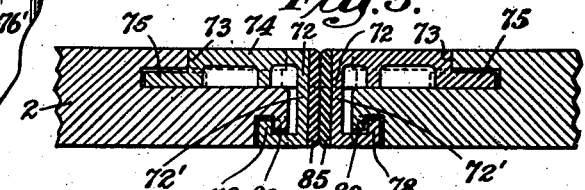
INVENTOR:
William Blackmore
BY
Clarence S Kerr
his ATTORNEY

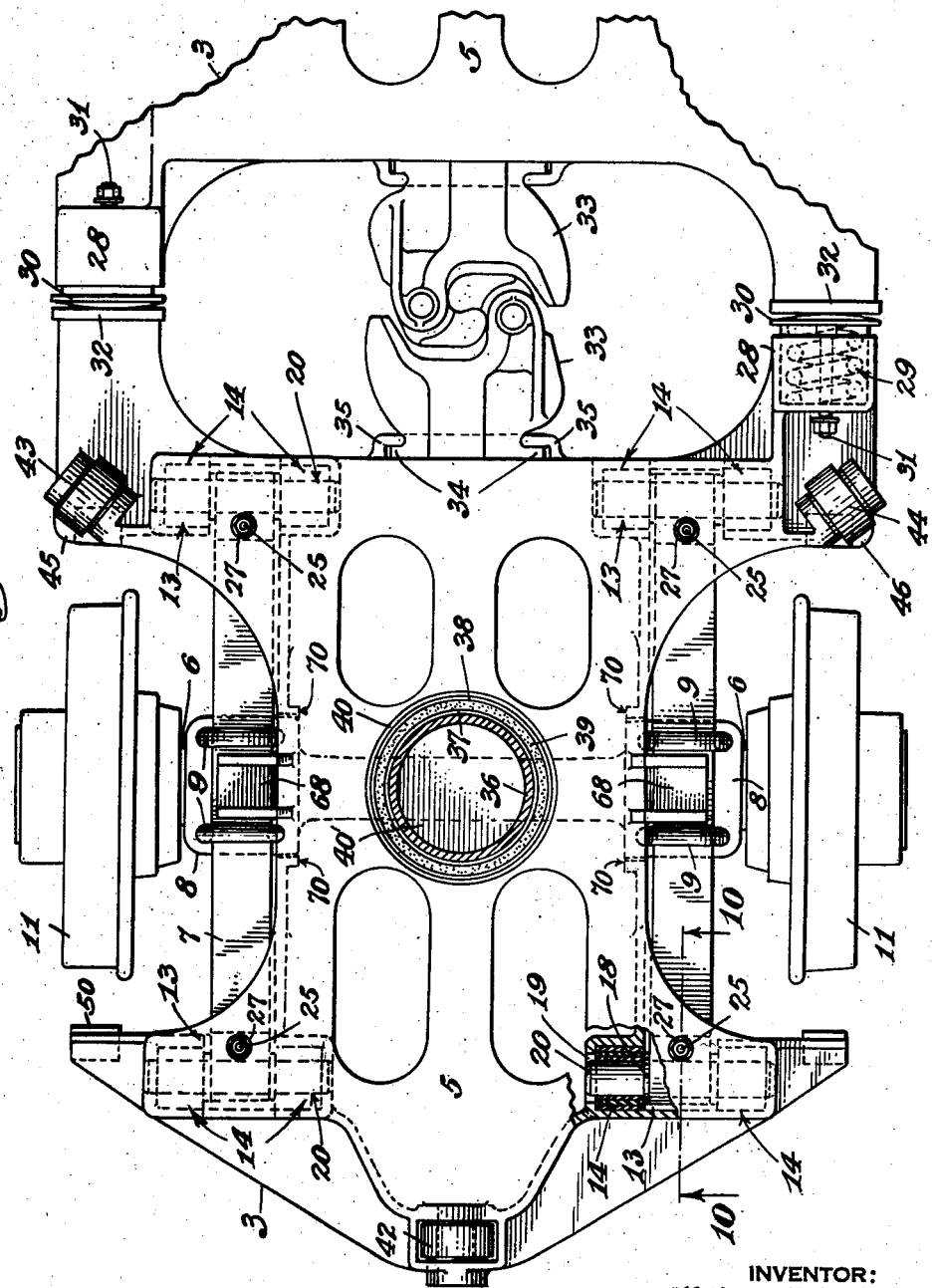

July 25, 1939.    W. BLACKMORE    2,167,231
CAR TRUCK
Filed Jan. 22, 193    4 Sheets-Sheet 3
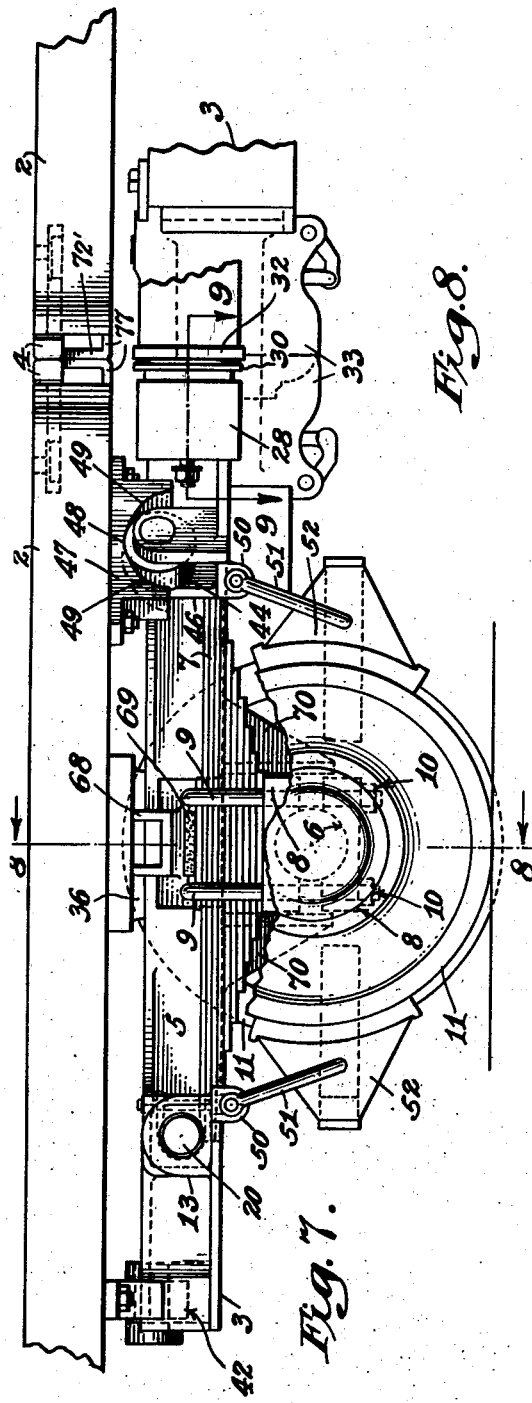
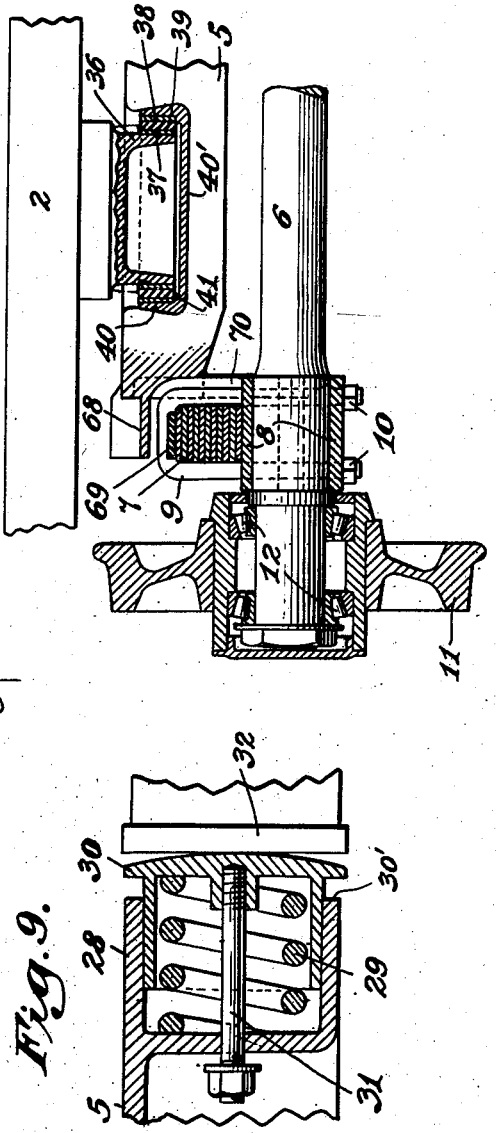
INVENTOR:
William Blackmore
BY
Clarence Kerr
his ATTORNEY July 25, 1939. W. BLACKMORE 2,167,231
CAR TRUCK
Filed Jan. 22, 1935 4 Sheets-Sheet 4

INVENTOR:
William Blackmore
BY
Clarence Kerr
his ATTORNEY.

Patented July 25, 1939

2,167,231

UNITED STATES PATENT OFFICE 2,167,231

CAR TRUCK

William Blackmore, Cleveland Heights, Ohio, assignor to National Malleable and Steel Castings Company, Cleveland, Ohio, a corporation of Ohio Application January 22, 1935, Serial No. 2,850

5 Claims. (Cl. 105—157)

This invention relates to railway car trucks and has for an object the provision of a novel and improved car truck of the two wheel type, simple and sturdy in construction and reliable and efficient in operation. My novel car truck is especially advantageous in conjunction with cars for light weight, high speed trains, though its utility is manifestly not restricted to cars of any particular weight or type. The invention also provides effectively for tight coupling of the trucks of adjacent cars. A further feature of the invention resides in provisions for enabling swiveling of the car body with respect to the truck and for urging the truck into such position with respect to the car that the truck axle is at right angles to the center line of the car, when the latter is uncoupled. The invention additionally provides novel and efficient means for mounting a leaf spring between the truck and car body for supporting said body on said truck. Also, the invention provides new and effective platform buffer constructions, for preventing the occurrence of undesirable gaps between the car platforms during passage of the cars around curves. The invention further enables the axles of adjacent coupled trucks to be maintained in positions substantially radial to a curve as the cars travel along the latter. Other features and advantages of the invention will be hereinafter described and claimed.

In the accompanying drawings,

Figure 1 is a fragmentary top plan view showing the ends of two adjacent cars of a train equipped with car trucks and platform buffers embodying my invention.

Figure 2 is an enlarged top plan detail view, with parts broken away and parts in horizontal section, showing the platform buffers of Figure 1

Figure 3 is a view in end elevation of a platform and associated buffer, taken on line 3—3 of Fig. 2.

Figure 4 is a longitudinal vertical sectional view on line 4—4 of Fig. 2.

Figure 5 is a vertical sectional view similar to Figure 4 but showing a modified form of platform buffer construction.

Figure 6 is a top plan view partly in section showing a truck embodying my invention, together with a portion of the adjacent truck.

Figure 7 is a side elevational view of the trucks shown in Figure 6, together with portions of the cars mounted thereon.

Figure 8 is a vertical sectional view taken on line 8—8 of Figure 7.

Figure 9 is a horizontal sectional view on line 9—9 of Figure 7.

Figure 10:
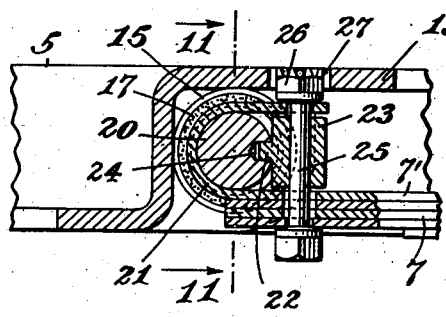
Figure 10 is a vertical sectional view on line 10—10 of Figure 6.

Referring to the drawings there are shown at 2, 2 the adjacent end portions of two cars equipped with trucks 3, 3, and platform buffers 4, 4 in accordance with my invention. It will, of course, be understood that each car is equipped at both ends with a truck 3 and platform buffer 4, but a consideration of one end is sufficient for an understanding of the invention.

Figure 11:
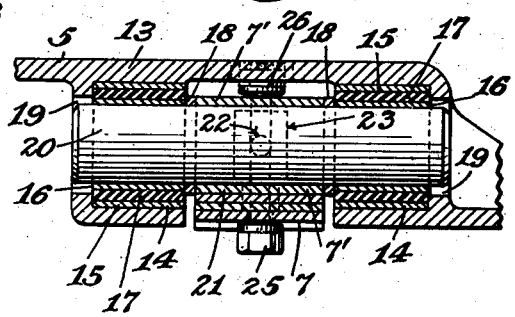
Figure 11 is a vertical sectional view on line 11—11 of Figure 10.

As shown more particularly in Figures 6–8, each truck 3 comprises a body portion 5 supported from the axle 6 through the medium of spring means, here illustrated as a pair of leaf springs 7, 7. Each leaf spring may, as shown in Figures 7 and 8, be mounted at its central portion on the axle 6, through a pair of upper and lower blocks 8, 8, engaging the axle and a pair of U-bolts 9, 9, which are passed over the leaf spring and through the blocks. Nuts 10 on the lower ends of the U-bolts cooperate with the latter to clamp the leaf spring firmly to the blocks 8, 8, and to maintain the latter in position on the axle. While the axle might, if desired, be integral with the wheels 11, 11, and thus rotate in the blocks 8, 8, I have shown the axle as non-rotating, and the wheels as rotatable with respect to said axle. Roller bearings 12 of conventional design may be interposed between each wheel 11 and the associated end portion of the axle 6, so as to enable the wheels to rotate freely with respect to the axle and to each other. The ends of each leaf spring 7, 7, are attached to the truck body 5 through means which may be constructed as follows:

Adjacent the ends of each leaf spring the truck body is provided with pocket portions 13, 13, in the ends of each of which portions there are mounted a pair of bushings 14, 14; each of the latter, as shown particularly in Fig. 11, comprising a pair of concentric cylinders, 15, 16 between which is a rubber sleeve 17. The bushings 14, 14 in each pocket portion 13 are spaced apart a distance slightly greater than the width of the leaf spring 7, as will be clear from Figs. 6 and 11. A pair of spacing washers 18, 18 are interposed between the sides of the leaf spring and the inner ends of the bushings. The ends of each of the pocket portions 13 are open as shown at 19, 19, thus enabling a pin 20 to be readily slid into the pocket portion and to be passed through the bushings 14 therein, as well as through a loop 21 formed by bending the upper leaf 7' of the spring 7 into the position shown in Fig. 10. Said pin 20 may be retained in position by a projection 22 on a sleeve 23, which projection fits into an opening 24 in said pin. A bolt 25 is passed through the leaf spring 7 and thence through the sleeve 23 and the free end of the bent leaf 7'. Through the nut 26 on the bolt 25 the leaf spring, sleeve 23, and pin 20 are firmly united in assembled relation. The nut 26 may be locked in position in any well-known manner, and may be conveniently reached for operation through an opening 27 in the truck body 5. Through the bushings 14, pin 20, sleeve 23, and bolt 25 at each end of each leaf spring 7 it will be readily apparent that the truck body 5 is securely attached to the ends of said springs. At the same time, through the rubber sleeves 17 of the bushings 14 the transmission of noise from the rails to the truck is materially reduced. In addition, by bending the leaf 7' of each leaf spring into the loop formation 21 at its opposite ends, so that its free ends engaged by the bolts 25 act as cantilevers, tension is imparted to the adjacent leaves of the spring and friction between the leaves is increased. A particularly effective snubbing of undesirable oscillations and prevention of excess recoil are thereby obtained.

The outer end of the truck has a cylindrical extension 28 which receives a spring 29 and a buffer member 30. A bolt 31 maintains the buffer member 30 and spring 29 in assembled relation to the cylinder 28. At the opposite side of the truck is a projection 32, which is adapted to cooperate with the spring pressed buffer 30 of the opposing truck. In short, each truck is provided with a resilient buffer 30 and a rigid extension 32 projecting forwardly from opposite sides of the truck; the rigid member on one side of the truck abutting the resilient buffer on the opposing truck, and the resilient buffer on the first mentioned truck abutting the rigid member on the opposing truck.

Each truck may have suitably attached thereto a coupler 33 of standard design. The couplers may, if desired, be bolted directly to the truck bodies and desired relative vertical movement between opposing couplers obtained by permitting the coupler knuckles to slide vertically relative to each other; or, if desired, relative vertical movement between opposing trucks may be obtained by mounting the couplers in the manner illustrated in Figure 6, wherein lateral projections 34, 34 on each coupler engage slidably in vertical guideways 35, 35 on the truck body, whereby the coupler may move vertically with respect to its associated truck. The latter mounting may be employed if, for example, the couplers are of such nature that their knuckles cannot slide vertically with respect to each other.

It will readily be seen that when two adjacent trucks are coupled together, the buffers 30 will maintain the wheels and axles in alinement. The present invention includes means for maintaining the truck axle 6 at right angles to the center line of the car when the latter is uncoupled. The end of the car body is mounted on the truck through an annular center plate 36 extending downwardly from the car body, which center plate fits into the inner cylinder 37 of a bushing on the truck comprising the metal cylinders 37, 38 and an annular strip of rubber 39 therebetween. The cylinder 38 of said bushing fits within an annular pocket or recessed member 40, either cast integrally with the truck body 5 or suitably secured thereto, the lower rim of the bushing cylinder 38 further resting upon an annular ledge 41 in said member 40. It will be noted particularly from Fig. 8 that the body center plate 36 does not rest upon the bottom 40' of the center plate member 40 of the truck body. At the same time, sufficient clearance is provided between the inner metal cylinder 37 and the body center plate member 36 to enable the truck to swivel freely with respect to the car body. The car body is supported on the body of the truck by the three rollers shown on the truck body at 42, 43, and 44. Roller 42 is provided on the center line of the truck at the rear end thereof, while roller 43 is mounted on an extension 45 of the truck body to the rear of the rigid projection 32 thereof, and roller 44 is mounted on extension 46 of the truck body to the rear of the buffer cylinder 28. Fastened to the under side of the car body above the respective rollers 42, 43, and 44 are bearing members 47, each comprising an intermediate surface 48 concentric with the associated roller and two converging surfaces 49, 49. When the center line of the truck is in alinement with the center line of the car body, or, in other words, the wheel axle 6 is perpendicular to the center line of the car body, the three rollers 42, 43, and 44 engage the intermediate curved surfaces 48 of the respective bearing elements 47. Now if the wheel axle tends to depart from perpendicular relationship to the center line of the car body, the rollers each engage one of the converging surfaces 49 of the associated bearing member 47, thereby tending to raise the car body. The weight of the car, of course, urges the latter into the lowest level with respect to the rollers, and tends to bring the intermediate surfaces 48 of the bearing elements 47 into engagement with said rollers, whereby there is exerted a straightening action on the wheels and axle, urging the latter into perpendicular relation to the center line of the car body. Thus upon departure of the wheel axle from said relation to the car body a powerful restoring force is exerted thereon.

Figure 12:
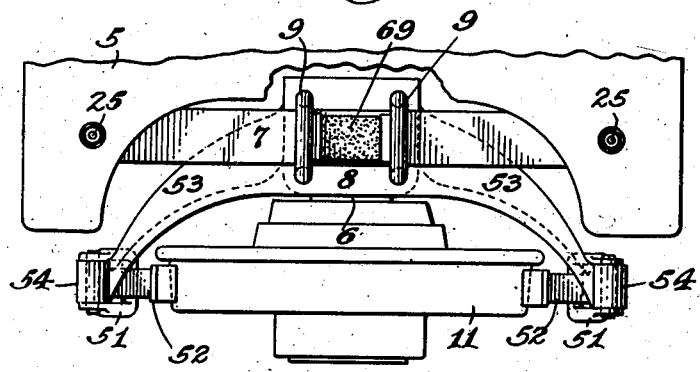
Figure 12 is a top plan view, partly broken away, illustrating a modified form of brake hanger bracket mounting.
Figure 13:
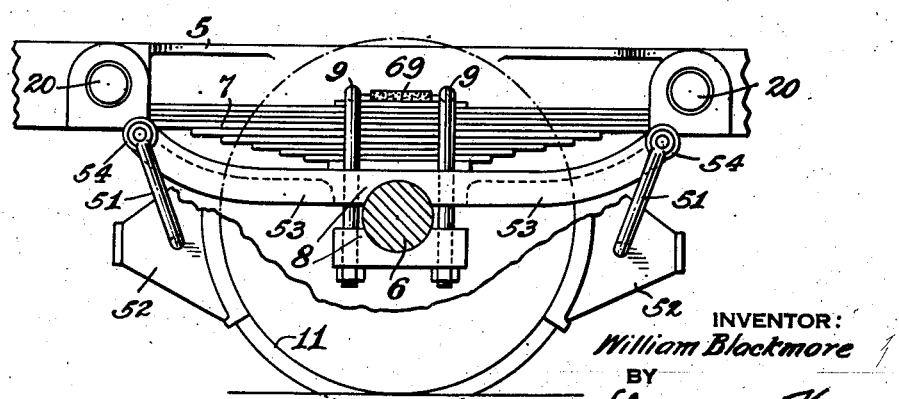
Fig. 13 is a side elevational view showing the brake hanger bracket mounting of Figure 12.

Brake hanger brackets 50 may, if desired, be cast integrally with the truck body 5 for accommodating conventional brake hangers 51 and shoes 52. Alternatively, each of the upper blocks 8 which receives the central portion of the leaf spring 7, as previously described, may be provided with projections 53, 53, Figures 12 and 13, either cast integrally with said block or suitably attached thereto; said projections being formed at their ends with brake hanger brackets 54, 54 for accommodating the hangers 51, 51 as shown. With this construction the brake hanger brackets do not participate in vertical movements of the truck frame with respect to the wheels.

The truck body 5 is further provided with projections 68 which overlie the leaf springs 7. Rubber blocks 69 may be interposed between said projections 68 and said leaf springs. The projections are normally spaced from the rubber blocks, as shown in Figures 7 and 8, but in the event that a leaf spring breaks, the truck body 5 would be limited in its drop by the engagement of a projection 68 with the corresponding rubber block 69. Said blocks and projections further-more limit tilting of the car body about its longitudinal axis. Pedestals or jaws 70 extending downwardly from the truck body 5 cooperate with adjacent sides of the blocks 8, 8, as illustrated in Figure 7, and insure that the wheels and axle are maintained in proper position longitudinally of the truck if a leaf spring should break. Normally, the leaf springs hold the axle in such position that there is clearance between the blocks 8, 8 and the inner walls of the jaws or pedestals 70.

In addition to the features hereinbefore described, my invention presents the further advantage that in rounding curves the trucks of adjoining cars are so controlled that their axles are caused to be maintained in positions substantially radial to the curve. Thus, for example, referring to Fig. 1, and assuming a curve in the direction indicated at A, it will be apparent that in traversing the curve the inner sides B of the car bodies tend to approach each other and the outer sides C to draw apart. The weights of the respective car bodies, acting upon the rollers 42—44 on the tops of the trucks, tend to maintain said axles perpendicular to the center lines of the cars. However, the adjacent trucks, in pivoting about the coupler knuckles, cause the inner buffer 30 to be compressed; and when said buffer is tight against the forward wall 30' (Fig. 9) of the spring case, further swinging of said trucks under the action of the cars is prevented. The axles now extend in the directions indicated at D, D, pointing substantially toward the center of curvature of the track, and are thus substantially radial to the curve. Further swinging of the car bodies with respect to the trucks in the direction wherein the inner sides of said car bodies approach each other simply results in raising the car bodies with respect to the trucks, due to the coaction between the rollers 42-44 and the converging surfaces of the respective bearing members 47. Owing to the fully compressed inner buffer 30 the trucks are prevented from being swung by the car bodies to such extent that their axles depart an undesirable amount from directions radial to the curve. In Fig. 1 the center lines of the car bodies are indicated at E, E, and the center lines of the trucks at F, F, for the purpose of illustrating that in rounding said curve A, A, the inner buffer 30 prevents the trucks from following the swinging of the cars to such extent as to cause their axles to depart undesirably from radial relation to the curve. It will be seen that if the center lines F, F of the trucks were coincident with the center lines E, E of the cars in rounding said curve the wheel flanges would be subjected to considerably greater wear than results from the maintaining of the trucks with their axles along the lines D, D. For curves of shorter curvature than said curve A the center lines of the cars will assume a sharper angle to each other, and hence in the absence of said buffer 30 the trucks would likewise swing into positions at a sharper angle with respect to each other, with consequent pronounced wear upon the wheel flanges; but due to the complete compression of said buffer the trucks are prevented from swinging beyond the positions illustrated in Fig. 1 under the action of the cars in rounding such curves. For curves of very large radii the axles will normally not depart substantially from radial position, even though said inner buffer 30 be not fully compressed. The clearance between said buffer 30 and the end 30' of the case 28 should be small enough to prevent the trucks from being swung so far with respect to each other as to bring their axles an undesirable amount out of radial relation to the tracks under the action of the cars in rounding curves of short radii of curvature, but said clearance should at the same time preferably be sufficiently large to permit angling of said trucks to retain their axles at right angles to the center lines of the cars under the action of the latter in rounding curves of long radii of curvature to enable said axles to point substantially toward the centers of curvature of said long curves. Thus, the inner buffers of the trucks prevent said trucks, under the action of the cars, from departing undesirably from positions wherein their axles are radial to the curves around which they are caused to travel, and said buffers enable said axles to be maintained in positions substantially radial to said curves.

As shown in Figures 1-4, the invention also includes a novel platform buffer construction for enabling passage from one car to the next to be readily accomplished despite angling of the cars with respect to each other, as in rounding curves. For this purpose each car is provided at each end with a buffer casting 71 having a vertical wall 72 facing the opposing car, together with a vertically curved rear wall 73 which fits into a corresponding socket in the platform of the car. A horizontal wall 74 joins the front and rear walls 72 and 73 and is flush with the platform of the car so that no obstruction is offered to parties walking from one car to the other. Extending rearwardly from the wall 73 is a horizontal flange 75 which enters a corresponding recess 76 in the platform and aids in maintaining the platform buffer in position. Extending rearwardly from the bottom of a downward extension 72' of wall 72 is a horizontal wall or flange 77 which, at its rear end, has an upwardly extending flange portion 78 entering a curved recess 79 in the bottom of the platform and engaging behind a curved downwardly projecting lip 80 of said platform. Between the rear curved wall 73 of the buffer casting 71' and the corresponding curved surface 73' of the platform there is positioned a rubber strip 81 sufficiently yielding to rearward movement of the buffer casting as to enable the car bodies to approach each other closely enough for coupling. The rubber strip 81 may conveniently be held in place by a thin strip of metal 82 fastened at its ends to the platform wall 73' by bolts 83, 83, as shown in Figure 2. It will be observed that clearance is provided between the flange 78 and the wall 79' of the recess 79 to take care of rearward movement of the casting 71, and that clearance for this purpose is further provided between the extension 72' of wall 72 and the end 84 of the platform. Clearance is also provided between the end of the horizontal flange 75 and the wall 76' of the recess 76, in which said flange engages. The wall 73', 76', and 79', together with the rear surface of the lip 80, are curved, as shown, as are also the wall 73, the rear surface of the flange 75, and the surfaces of the flange 78 of the casting 71, as shown, to provide for swiveling between the casting 71 and the car body to maintain said casting in engagement with the casting 71 of the opposing car, as shown in Figure 1, despite angling of the cars in passing around curves. The buffer casting 71 may be readily assembled in the platform by simply pivoting it in place, starting from either side of the platform.

In the modified platform buffer construction shown in Figure 5, parts similar to those of Figures 1-4 are designated by the same reference numerals. In this modified construction the rubber strips 81 of Figures 1-4 have been omitted and instead blocks or strips of rubber 85 are vulcanized or otherwise secured to the faces of the vertical walls 72 and their extensions 72'.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A railway car truck comprising a body, an axle, leaf springs mounted on said axle and supporting said truck body through end portions of said springs, said truck body having a relatively narrow center section above said axle and means projecting from opposite sides of said center section and overlying intermediate portions of said leaf springs for engagement therewith in event of failure of said end portions.

2. A railway car truck comprising a body for supporting a car body in pivotal relation thereto, an axle, leaf springs mounted on said axle and supporting said truck body, and means projecting from opposite sides of said truck body and adapted to limit tilting of said truck body by engagement with substantially rigid portions of said springs.

3. A railway car truck comprising a body having a relatively narrow center section and a relatively wide end section, buffers mounted near the side extremities on said wide end section, an axle, leaf springs supported on said axle and supporting said truck body through end portions of said springs, and means projecting from opposite sides of said center section and overlying intermediate portions of said leaf springs for engagement therewith in event of failure of said end portions.

4. A railway car truck comprising a body having a relatively narrow center section and relatively wide end sections, rollers on said end sections for supporting a car body, an axle underneath said center section, leaf springs supported on said axle and supporting said truck body through end portions of said springs, and means projecting from opposite sides of said center section and overlying intermediate portions of said leaf springs for engagement therewith in event of failure of said end portions.

5. A railway car truck comprising a body having a relatively narrow center section and relatively wide end sections, an axle underneath said center section, leaf springs supported on said axle and supporting said truck body through end portions of said springs associated with the end sections of said truck body, and means projecting from opposite sides of said center section and overlying intermediate portions of said leaf springs for engagement therewith in event of failure of said end portions.

WILLIAM BLACKMORE.